(12) United States Patent
Collet et al.

(10) Patent No.: US 11,170,265 B2
(45) Date of Patent: Nov. 9, 2021

(54) IMAGE PROCESSING METHOD AND AN IMAGE PROCESSING SYSTEM

(71) Applicant: I.R.I.S., Mont-Saint-Guibert (BE)

(72) Inventors: Frédéric Collet, Etterbeek (BE); Jordi Hautot, Neupre (BE); Michel Dauw, Machelen (BE)

(73) Assignee: I.R.I.S., Mont-Saint-Guibert (BE)

(*) Notice: Subject to any disclaimer, the term of this patent is extended or adjusted under 35 U.S.C. 154(b) by 0 days.

(21) Appl. No.: 16/286,438

(22) Filed: Feb. 26, 2019

(65) Prior Publication Data

US 2019/0266447 A1 Aug. 29, 2019

(30) Foreign Application Priority Data

Feb. 28, 2018 (GB) .................................. 1803262

(51) Int. Cl.
*G06K 9/00* (2006.01)
*G06K 9/62* (2006.01)
(Continued)

(52) U.S. Cl.
CPC ............. *G06K 9/6262* (2013.01); *G06K 9/03* (2013.01); *G06K 9/036* (2013.01); *G06K 9/2072* (2013.01);
(Continued)

(58) Field of Classification Search
CPC ....... G06K 2009/6213; G06K 2209/01; G06K 9/03; G06K 9/036; G06K 9/46;
(Continued)

(56) References Cited

U.S. PATENT DOCUMENTS 5,251,268 A * 10/1993 Colley .................. G06K 9/685
382/156
5,835,633 A * 11/1998 Fujisaki ............... G06K 9/6292
382/187
(Continued)

FOREIGN PATENT DOCUMENTS

JP S5635276 A 4/1981
JP H06508464 A 9/1994
(Continued)

OTHER PUBLICATIONS

Gorgevik, et al, Word Candidate Generation in Cyrillic OCR Based on ALN Classifiers, IEEE Mediterranean Electrotechnical Conference, vol. 2, May 1998, pp. 870-874.

*Primary Examiner* — Andrew M Moyer
(74) *Attorney, Agent, or Firm* — Canon U.S.A., Inc, IP Division

(57) ABSTRACT

An image processing method for recognising characters included in an image. A first character recognition unit performs recognition of a first group of characters corresponding to a first region of the image. A measuring unit calculates a confidence measure of the first group of characters. A determination unit determines whether further recognition is to be performed based on the confidence measure. A selection unit selects a second region of the image that includes the first region, if it is determined that further recognition is to be performed. A second character recognition unit performs further recognition of a second group of characters corresponding to the second region of the image.

14 Claims, 6 Drawing Sheets

(51) Int. Cl.
  *G06K 9/03* (2006.01)
  *G06K 9/20* (2006.01)
  *G06K 9/46* (2006.01)
  *G06K 9/72* (2006.01)

(52) U.S. Cl.
  CPC ............ *G06K 9/46* (2013.01); *G06K 9/6202* (2013.01); *G06K 9/6217* (2013.01); *G06K 9/72* (2013.01); *G06K 2009/6213* (2013.01); *G06K 2209/01* (2013.01)

(58) Field of Classification Search
  CPC .. G06K 9/6202; G06K 9/6217; G06K 9/6262; G06K 9/72; G06K 9/62; G06K 9/2072; G06K 9/18; G06K 9/6857
  USPC .......................................... 382/155–161, 229
  See application file for complete search history.

(56) References Cited

U.S. PATENT DOCUMENTS

| | | | | |
|---|---|---|---|---|
| 5,933,531 | A * | 8/1999 | Lorie | G06K 9/033 345/108 |
| 6,104,833 | A * | 8/2000 | Naoi | G06K 9/6807 382/190 |
| 6,272,242 | B1 * | 8/2001 | Saitoh | G06K 9/62 382/187 |
| 8,391,583 | B1 * | 3/2013 | Mennie | G07D 7/003 209/534 |
| 8,417,017 | B1 * | 4/2013 | Beutel | G06Q 20/042 382/135 |
| 8,428,332 | B1 * | 4/2013 | Csulits | G07F 19/20 235/379 |
| 8,755,604 | B1 * | 6/2014 | Gross | G06K 9/72 382/181 |
| 8,873,856 | B1 * | 10/2014 | Chapleau | G06K 9/344 382/173 |
| 8,929,640 | B1 * | 1/2015 | Mennie | G07D 7/00 382/135 |
| 2004/0037470 | A1 | 2/2004 | Simske | |
| 2004/0243406 | A1 * | 12/2004 | Rinscheid | G06F 40/216 704/231 |
| 2008/0008383 | A1 * | 1/2008 | Andel | G06K 9/00 382/173 |
| 2009/0063431 | A1 * | 3/2009 | Erol | G06K 9/6293 |
| 2009/0067726 | A1 * | 3/2009 | Erol | G06F 16/955 382/197 |
| 2009/0070415 | A1 * | 3/2009 | Kishi | G06F 16/00 709/203 |
| 2009/0074300 | A1 * | 3/2009 | Hull | G06K 9/00463 382/209 |
| 2009/0100048 | A1 * | 4/2009 | Hull | G06F 16/955 |
| 2010/0246999 | A1 | 9/2010 | Tillberg | |
| 2011/0268360 | A1 * | 11/2011 | Antonijevic | G06K 9/344 382/177 |
| 2012/0166435 | A1 * | 6/2012 | Graham | G06F 16/955 707/728 |
| 2013/0188863 | A1 | 7/2013 | Linderman | |
| 2014/0023274 | A1 * | 1/2014 | Barman | G06K 9/723 382/182 |
| 2014/0212039 | A1 | 7/2014 | Barkan | |
| 2015/0009542 | A1 | 1/2015 | Zhao | |
| 2015/0010233 | A1 * | 1/2015 | Barman | G06K 9/36 382/167 |
| 2015/0227787 | A1 * | 8/2015 | Mehta | G06F 40/174 705/40 |
| 2015/0356365 | A1 | 12/2015 | Collet | |
| 2016/0063321 | A1 * | 3/2016 | Reese | G06T 7/70 382/187 |
| 2018/0109685 | A1 * | 4/2018 | Balamurugan | G06K 9/00483 |
| 2019/0205707 | A1 * | 7/2019 | Matsuda | G06K 9/6267 |
| 2019/0236614 | A1 * | 8/2019 | Burgin | G06Q 30/0185 |

FOREIGN PATENT DOCUMENTS

| | | |
|---|---|---|
| JP | 2004046315 A | 2/2004 |
| JP | 2009245464 A | 10/2009 |
| JP | 2010217996 A | 9/2010 |

* cited by examiner

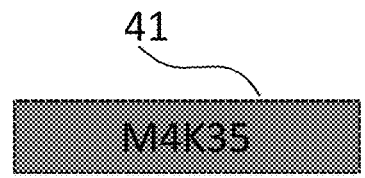
FIG. 4A
FIG. 4B
43
EXAMPLE OF A LINE WHERE CONTEXT MAKES A DIFFFERENCE.
FIG. 4C

51

52 describes in greater detail 53　　　　　　　　　51　　52

The next sect on describes in greater detail

IMAGE PROCESSING METHOD AND AN IMAGE PROCESSING SYSTEM

CROSS-REFERENCE TO RELATED APPLICATION

The present patent application claims the benefit under 35 U.S.C. § 119(a)-(d) of United Kingdom Patent Application No. GB1803262.3, filed on Feb. 28, 2018 and entitled "AN IMAGE PROCESSING METHOD AND AN IMAGE PROCESSING SYSTEM." The content of GB1803262.3 is incorporated herein by reference in its entirety.

TECHNICAL FIELD

The present invention relates to an image processing method and an image processing system for recognising characters included in an image. In particular, the present invention relates to character recognition of an image.

BACKGROUND

Character recognition is performed to convert text included in an image into machine-encoded text. Images that can be analysed using character recognition software include a scanned document, a photograph of a document, a photograph of a scene, a video recording, and text that has been superimposed on a document. The text in the image that can be converted includes typewritten, handwritten, and printed text. The machine-encoded text includes any character encoding standard for electronic communication, such as ASCII, unicode and emoji. Applications of character recognition include:

- displaying to a user machine-encoded characters that correspond to the text included in the image;
- overlaying the image with the machine-encoded characters, so that the text can be selected by the user;
- providing a search function of text included in the image by allowing search of the machine-encoded text;
- machine reading where a computing device interprets the context of text including in the image;
- data entry of the machine-encoded characters which correspond to the text included in the image;
- automatic number plate recognition; and
- converting handwriting in real time, to enter text into a computing device.

Character recognition software is configured to receive an image as input, and output machine-encoded text. Furthermore, the character recognition software can perform error analysis to determine a confidence measure of the machine-encoded text that is output.

The term character recognition refers to the identification and recognition of individual characters in the image. However, the term character recognition also is used to include word recognition, where the identification and recognition occurs one word at a time. Character recognition is exemplified by optical character recognition, optical word recognition, intelligent character recognition, and intelligent word recognition.

Character recognition is customised based on the writing system that is included in the document, such as Latin, Cyrillic, Arabic, Hebrew, Indic, Bengali, Devanagari, Tamil, Chinese, Japanese, Korean, Morse code, and Braille characters. Character recognition is further customised based on the language of the text included in the image. The writing system and language of the text can be identified by the user, or alternatively, the writing system and language of the text can be identified by the character recognition software from the context of characters and words that are recognised. Furthermore, the character recognition can be customised to handle documents which include text in a number of writing systems or languages.

Character recognition occurs by associating machine-encoded characters with at least one example of a glyph that could be found in an image. The accuracy of the character recognition is improved by increasing the number of glyphs that represent a machine-encoded character. This is particularly useful for enhancing accuracy at recognising a variety of fonts. Intelligent recognition is achieved by using machine learning to train a computer system that makes use of a neural network. Intelligent recognition enhances the recognition of characters that do not correspond to the glyphs stored as examples.

The machine-encoded text often contains errors. The errors can be corrected by a user proof-reading the machine-encoded text. This places a burden on the user, and so techniques are available to enhance the accuracy of the character recognition, and to enhance the detection of errors. For example, the character recognition accuracy can be increased if the output is influenced by a lexicon, which is a dictionary of words that are expected to occur in a document. The detection of errors can be enhanced by performing a spell-check or a grammar-check, to assess the context of the machine-encoded text.

Character recognition has been developed that is specialised in performing detection under particular conditions. Character recognition is particularly difficult if the condition of the image is variable, in which case the most appropriate character recognition technique should be carefully selected. For example:

- character recognition software is typically customised to reading clean pages of a document that have been scanned by a multifunction peripheral device, in which case errors may be encountered if the image includes a watermark;
- character recognition software may be customised to read documents that are low quality, in which case the output characters will have an increased accuracy compared to character recognition software customised to read documents that are high quality; and
- automatic number-plate recognition is customised for reading vehicle registration plates, which is further enhanced to deal with different weather conditions and different styles of vehicle registration plates.

Character recognition software is specialised so that accuracy is enhanced. However, character recognition software consumes computer resources, such as processing power. Furthermore, the computer resources to be used affects the time for the character recognition software to be executed. Computer resources to be consumed depend upon the selected character recognition technique, and computer resources are also dependent upon the quality of the image. Consequently, a compromise needs to be reached between the available computer resources, and the desired level of accuracy.

SUMMARY

Aspects of the present invention are set out by the independent claims.

According to a first aspect there is provided an image processing method for recognising characters included in an image, the image processing method comprising: performing recognition of a first group of characters corresponding to a first region of the image; calculating a confidence measure of the first group of characters; determining whether further recognition is to be performed based on the confidence measure; selecting a second region of the image that includes the first region, if it is determined that further recognition is to be performed; and performing further recognition of a second group of characters corresponding to the second region of the image.

According to a second aspect there is provided an image processing system for recognising characters included in an image, the image processing system comprising: a first character recognition unit configured to perform recognition of a first group of characters corresponding to a first region of the image; a measuring unit configured to calculate a confidence measure of the first group of characters; a determination unit configured to determine whether further recognition is to be performed based on the confidence measure; a selection unit configured to select a second region of the image that includes the first region, if it is determined that further recognition is to be performed; and a second character recognition unit configured to perform further recognition of a second group of characters corresponding to the second region of the image. The features of the image processing system can be provided by one or more device.

Optionally, the image processing system includes an image processing apparatus comprising both the first character recognition unit and the second character recognition unit.

Optionally, the image processing system includes: a first image processing apparatus comprising the first character recognition unit; and a second image processing apparatus comprising the second character recognition unit.

According to a third aspect there is provided a non-transitory computer-readable medium storing a program that, when implemented by an image processing system, causes the image processing system to perform a method for recognising characters included in an image, the image processing method comprising: performing recognition of a first group of characters corresponding to a first region of the image; calculating a confidence measure of the first group of characters; determining whether further recognition is to be performed based on the confidence measure; selecting a second region of the image that includes the first region, if it is determined that further recognition is to be performed; and performing further recognition of a second group of characters corresponding to the second region of the image.

The best of a plurality of character recognition units is used to recognise characters in the image. Accordingly, character recognition is performed using character recognition units that are customised to the image. If the image includes a plurality of conditions, then character recognition units are allocated regions of the image to which they are customised. The allocation of resources is optimised by providing for computationally intensive character recognition to be performed on a region of the image that are identified as being low in quality.

Optionally, the image processing method performed by the image processing system further comprises: performing recognition of a plurality of first groups of characters corresponding to a plurality of first regions of the image; calculating a confidence measure for each of the first group of characters; determining whether further recognition is to be performed for each of the first group of characters, based on the corresponding confidence measure; selecting a plurality of second regions of the image that each include the corresponding first region, if it is determined that further recognition is to be performed; and performing further recognition of a plurality of second groups of characters corresponding to the plurality of second regions of the image. The further recognition is performed for a plurality of second regions, and so a plurality of errors will be corrected.

Optionally, determining whether further recognition is to be performed comprises selecting a maximum number of first groups of characters, based on the confidence measure for each of the first group of characters. Further recognition is performed a maximum number of times, so that available computing resources are allocated appropriately.

Optionally, recognition of the first group of characters comprises at least one of: matrix matching, wherein the first region is compared to a glyph; and feature extraction, wherein the first region is compared to a plurality of features of a glyph. Matrix matching and feature extraction are techniques that are performed by the first character recognition unit. Matrix matching and feature extraction can be performed individually or in combination. There is a synergy between recognition of the first characters and the further recognition of the second characters, so that a low amount of processing is used by the first character recognition unit, so that computational resources can be directed towards performing error correction.

Optionally, the confidence measure is based on an average weight for all of the characters of the first group of characters. A word is identified for which the confidence measure is low on average over all of the characters of the word.

Optionally, the confidence measure is based on a maximum weight for all of the characters of the first group of characters. A word is identified for which the confidence measure is low for a particular character of the word.

Optionally, it is determined that further recognition is to be performed if the confidence measure is below a threshold value. An assessment is made of whether further recognition is to be performed, so that computer resources are allocated appropriately. Accordingly, if a plurality of errors are identified, these errors can be attended to by performing further recognition in order of priority.

Optionally, it is determined that further recognition is to be performed if the first group of characters correspond to text in the first region that is identified as having a number of pixels below a threshold value. A low number of pixels indicates that it is likely that the character recognition will contain errors.

Accordingly, the further recognition can be customised for analysing documents which contain characters having a low number of pixels.

Optionally, it is determined that further recognition is to be performed if the first group of characters correspond to text in the first region that is identified as having a height that is below a threshold value. A low height results in characters having a low number of pixels, which indicates that it is likely that the character recognition will contain errors. Accordingly, the further recognition can be customised for analysing documents which contain text of varying height, such as covers of magazines and newspapers.

Optionally, further recognition of the second group of characters is customised to an image that is low quality. The accuracy of the character recognition is improved by using a second character recognition unit that is customised for the type of image that has been selected.

Optionally, further recognition of the second group of characters is customised to the second region of the image. The accuracy of the character recognition is improved by using a second character recognition unit that is customised for the type of second region that has been selected.

Optionally, further recognition of the second group of characters is specialised for a region of an image that is low quality. An assessment can be made of the second region to determine the quality level, with a second character recognition unit being selected that will result in a second group of characters being output for which the confidence measure will be high. The accuracy of the character recognition is enhanced by using a second character recognition unit that is customised to analyse low quality images.

Optionally, further recognition of the second group of characters makes use of a neural network. The neural network that is used has been trained to recognise a plurality of strings of words. The strings of words provide the neural network with context information, so that the second character recognition unit is customised to recognise words that are difficult to recognise in isolation.

Optionally, the second region further comprises words that are identified as being adjacent to the first region. Adjacent words provide context to the first region, and so the confidence measure is expected to be enhanced, increasing the likelihood that the error will be corrected.

Optionally, the second region further comprises words that are identified as being on the same line of text as the first region. Words on the same line of text as the first region provide context to the first region, and so the confidence measure is expected to be enhanced, increasing the likelihood that the error will be corrected.

Optionally, the second region further comprises words that are identified as providing context to the first region. A context measure is used to actively identify a second region that will provide context to the first region. Consequently, the confidence measure is expected to be enhanced, increasing the likelihood that the error will be corrected.

BRIEF DESCRIPTION OF THE DRAWINGS

Embodiments will now be described, by way of example only, with reference to the accompanying drawings, in which:

FIG. 4A provides an example of a first group of characters that is determined as containing an error based on a confidence measure;

FIG. 4B provides an example of a group of characters that includes the first group of characters; and FIG. 4C provides an example of a second group of characters for which errors have been corrected;

DETAILED DESCRIPTION

Various exemplary embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
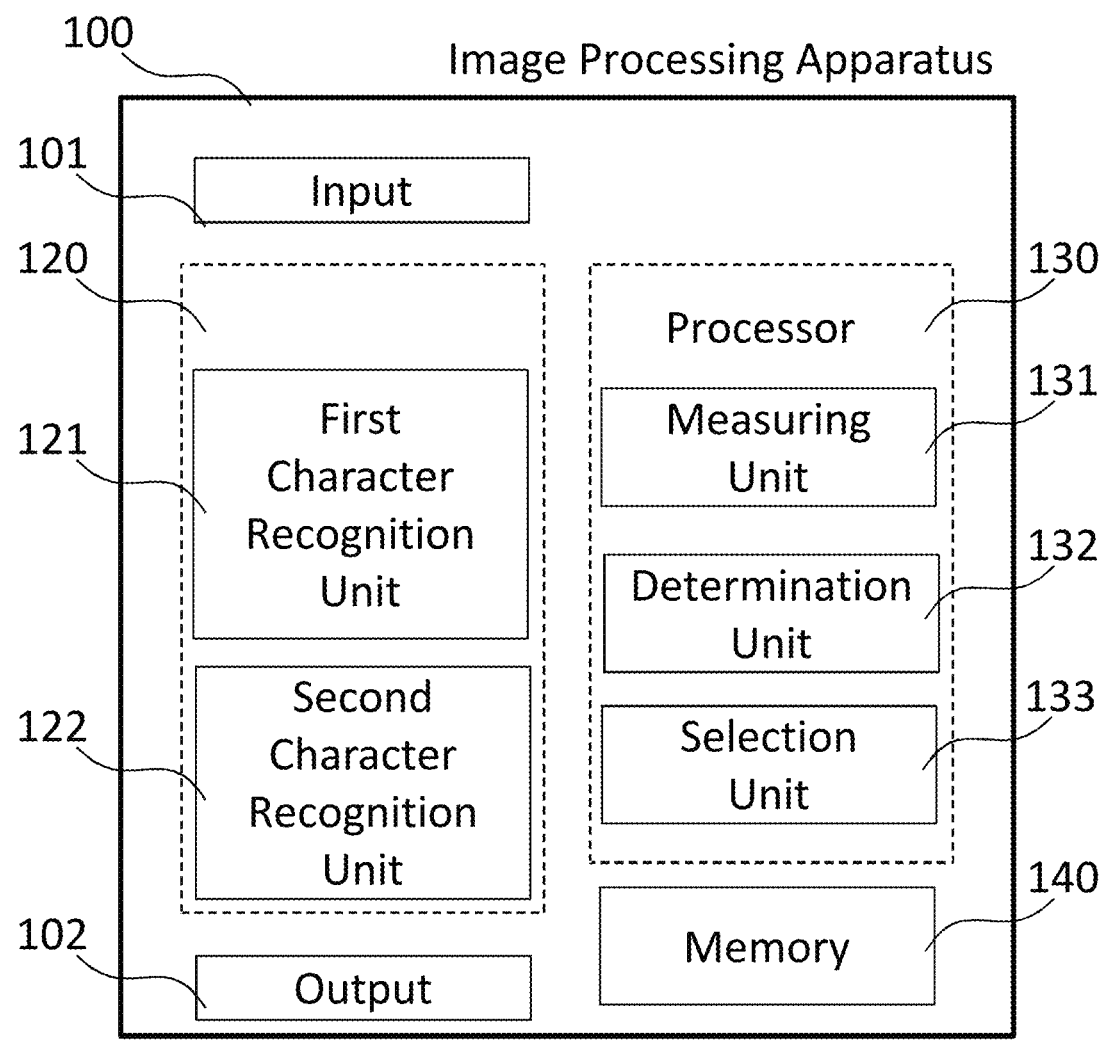
FIG. 1 is a schematic diagram that illustrates an image processing system for recognising characters included in an image.

FIG. 1 is a schematic diagram that illustrates an image processing system 100 for identifying text included in an image. The image processing system 100 includes an input 101 and an output 102, a plurality of character recognition units 120, a processor 130 and a memory 140. The image processing system 100 is exemplified by a single image processing apparatus 100 that includes the plurality of character recognition units 120. As an alternative, the image processing system 100 could comprise a plurality of image processing apparatus, each having a character recognition unit.

The plurality of character recognition units 120 includes at least a first character recognition unit 121 and a second character recognition unit 122, and may include further character recognition units. Each character recognition unit 120 performs the function of identifying characters in a region of an image, and associating the identified characters with machine-encoded text. The characters of the image are identified and recognised based on analysis of the pixels in the region the image. Characters can be recognised in a selection of languages, in a variety of fonts.

The different character recognition units 120 are customised so that character recognition is optimised for specific conditions. Examples of specific conditions include the quality of the image, the language of the text, the font of the text, whether the text is typewritten or handwritten, and the computing resources that are available.

The first character recognition unit 121 is configured to recognise all of the text in the image, and in particular, recognise a first group of characters corresponding to a first region of the image. The first character recognition unit 121 performs character recognition making use of conventional techniques to recognise the text in the image. Over segmentation is used to identify characters of the image. A character identified in the image is compared with a plurality of reference glyphs that are stored in a memory of the image processing system 100. A number of techniques are available for comparing a character identified in the image with the reference glyphs, such as matrix matching and feature extraction. Matrix matching involves the pattern of the pixels of the identified character being compared with the pattern of the pixels of the reference glyphs. Feature extraction decomposes the input character into features such as lines, closed loops, line direction and line intersections, and these extracted features are then compared with corresponding features of the reference glyphs.

The first region of the image is identified in retrospect of the character recognition being performed on the whole image, as a result of analysing the first group of characters. Alternatively, the first region can be identified before or during the character recognition being performed. The first recognition unit 121 is fast, and is reliable when analysing plain text that has not been obscured.

The second character recognition unit 122 is configured to further recognise a second group of characters corresponding to a second region of the image. The second character recognition unit 122 performs further recognition of the second group of characters by making use of a neural network that has been trained to recognise a plurality of strings of words. The second character recognition unit 122 makes use of conventional techniques that are available to recognise text in an image using a neural network. There is a synergy between recognition of the whole document by the first optical character recognition unit 121, followed by further recognition of the second region by the second optical character recognition unit 122, which confers a technical effect that computational resources are directed towards performing error correction.

The strings of words provide the neural network with context information, so that the second character recognition unit 122 is customised to recognise words that are difficult to recognise in isolation. Furthermore, the neural network can be trained so that low quality images can be accurately recognised. The training of the neural network is achieved by inputting representations of the characters that are to be recognised. The training phase performs a gradient descent technique so that the neural network is optimised by reducing output errors. The output of machine-encoded text is based on a probability measure from a comparison with the samples of text that are input during the training phase. Feed forward processing of the neural network is performed so that there is convergence towards the probability measure. The neural network is used to customise the second character recognition unit so that it can perform character recognition of characters that have not been encountered during the training of the neural network.

The second character recognition unit 122 provides enhanced recognition of text that has been obscured, although it is less accurate than the first recognition unit 121 at recognising plain text that has not been obscured. The second character recognition unit 122 improves the accuracy when recognising text in a low quality image. However, the performance of the second character recognition unit 122 is computationally intensive, resulting in the image processing performing slowly and consuming more processing resources.

Accordingly, it is necessary to find a balance between the level of accuracy that is desired and the allocation of resources. This is achieved by performing image recognition on the whole document using the first character recognition unit 121, and if it is determined that further character recognition is to be performed, performing further character recognition using the second character recognition unit 122.

The processor 130 functions as a measuring unit 131, a determination unit 132, and a selection unit 133. The measuring unit 131 is configured to calculate a confidence measure of the first group of characters. The determination unit 132 is configured to determine whether further recognition is to be performed based on the confidence measure. The selection unit 133 is configured to select the second region of the image, wherein the second region includes the first region. Accordingly, the processor 130 is configured to identify how to enhance accuracy and allocate resources effectively, by making use of character recognition provided by the plurality of character recognition units 120.

The analysis of the first character recognition unit 121 on the whole image results in a string of machine-encoded characters corresponding to all of the text that has been identified in the image. The measuring unit 131 provides a confidence value, so that the determination unit 132 can determine whether the string of machine-encoded characters includes errors. The identification of errors can be used in retrospect by the selection unit 133 to identify a first region of the image for which further recognition is to be performed. Once it has been determined that further recognition is to be performed, the selection unit 133 identifies a second region of the image that includes the first region, thus providing additional information that will be useful for further assessing the first region.

As an alternative, the first region could be selected in advance of the first character recognition unit 121 performing character recognition on the whole document. This allows the first region to be determined in advance as part of the image for which the first group of characters should be checked. This allows parts of the image to be prioritised, for example, if the user has identified that this part of the image is particularly important, or if it has been determined that the first region of the image is low quality.

The input 101 and output 102 are configured to receive and transmit electronic data. The input 101 is configured to receive the image that is to be analysed, for example, from a local area network, the internet, or an external memory. Furthermore, the input 101 is configured to receive instructions from a user via, for example, a mouse or a keyboard. The output 102 is configured to output the text that has been identified. The output 102 includes a display for identifying the text to the user. The output 102 includes a network connection for communicating over the internet.

The features of the image processing apparatus 100 can be arranged differently. For example, each of the character recognition units 120 can include a processor 130 that is configured to serve as a measuring unit 131, a determination unit 132, and a selection unit 133. The plurality of character recognition units 120 may be part of the same apparatus, or alternatively distributed as a system across a plurality of devices.

The image processing apparatus 100 can be a part of a personal computer. Alternatively, the image processing apparatus 100 can be part of a multifunction peripheral device, further including a scanner, a copier, a facsimile, and a printer.

Figure 2:
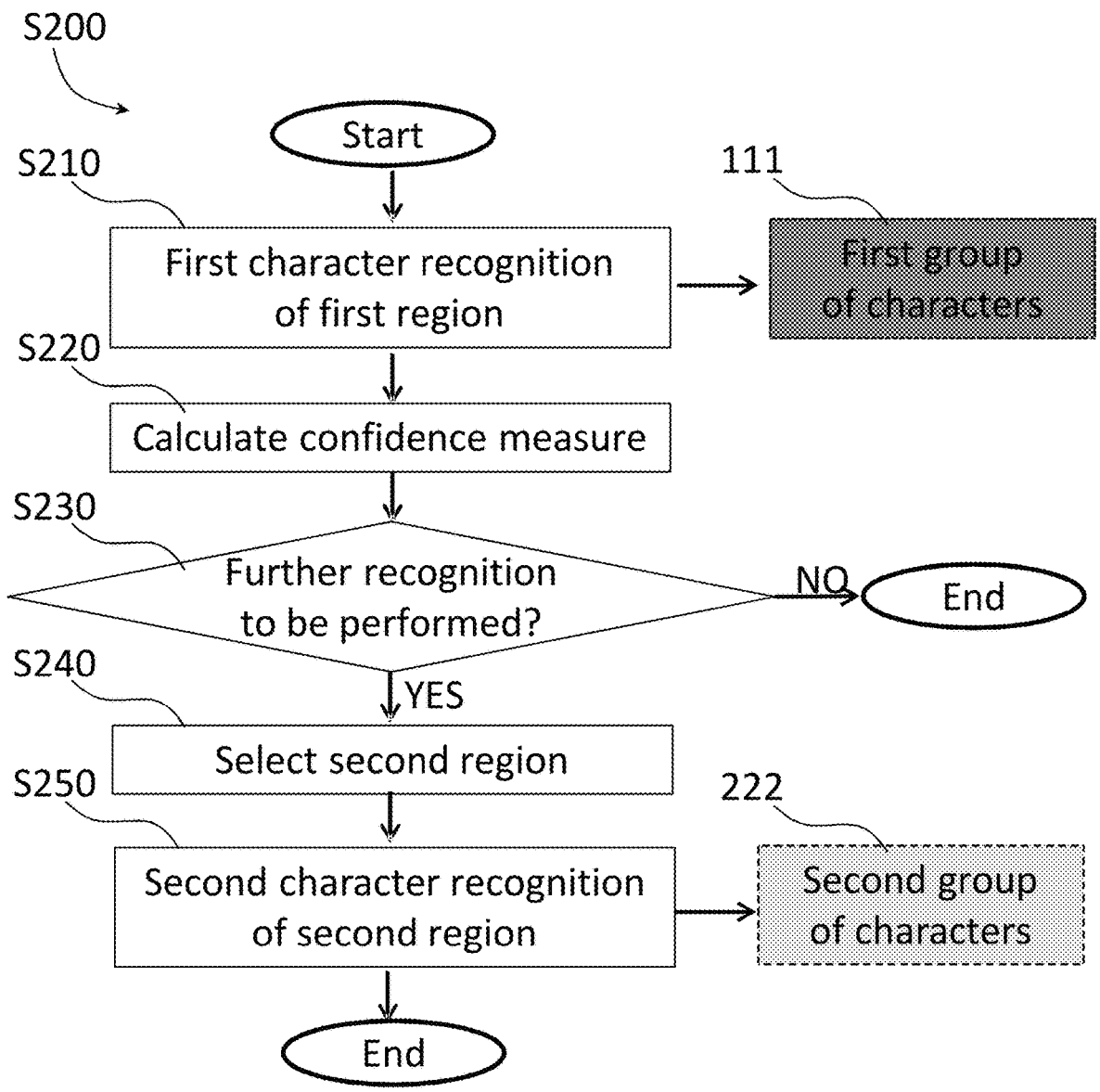
FIG. 2 is a flowchart illustrating an image processing method for recognising characters included in an image.

FIG. 2 is a flowchart illustrating an image processing method S200 for identifying text included in an image 300. The image processing method S200 is implemented by the image processing system 100. A program, that when implemented by the image processing system 100, causes the image processing system to perform the image processing method S200. A non-transitory computer-readable medium stores the program.

In step S210, the first character recognition unit 121 performs the function of recognising a first group of characters 111 corresponding to a first region of the image 300.

The first character recognition unit 121 performs over segmentation on the image, which identifies characters in the image. The image is segmented into pieces, and then each piece is recognised. The pieces are assembled and context information is used to make a decision for ambiguous cases. The over segmentation identifies words of the document, each word comprising a group of characters. The over segmentation identifies lines of text included in the document, each line of text comprising a group of words. The words and the lines can be used to provide context for the recognition of the characters in the image.

The first character recognition unit 121 performs character recognition for the whole document, and so all of the text in the image will be analysed. This is performed quickly, and provides a first technique for identifying the text in the document.

Over segmentation is used to identify words and characters of the text extracted from the image. A first group of characters corresponds to a word that is identified in the text. The first group of characters is a subset of the text that is extracted from the image. The first region is a portion of the image that includes the first group of characters. The accuracy of the text can be enhanced by identifying first regions for which the character recognition by the first character recognition unit 121 is low quality.

In some cases, the text includes a plurality of groups of characters for which the character recognition by the first character recognition unit 121 is low quality. In this case, a plurality of first regions of the image are identified, each of the first regions corresponding to a different first group of characters. The accuracy of the text can be enhanced by identifying a plurality of errors that should be corrected.

Each first region is associated with the corresponding first group of characters that have been recognised. Accordingly, it is possible to map between the input image and the output text. Associating the first region with the first group of characters is useful if the accuracy of the first group of characters needs to be investigated in further detail by performing character recognition again to the first group of characters. Furthermore, this is useful to have a mapping between the input image and the output text when adding a layer to the image to provide selectable machine-readable text that overlays the original image of the document.

In step S220, the measuring unit 131 performs the function of calculating a confidence measure of the first group of characters 111.

The confidence measure identifies the confidence level for each of the characters that is detected by a character recognition unit 120. The confidence level allows errors to be identified, and eliminated, in the text output from the first character recognition unit 121.

Errors typically occur if the image includes a style that has not been encountered before, such as a different font or text that has been obscured. There can be errors recognising punctuation, which results in difficulty recognising characters. Also, defects in the image can obscure the text. The quality of the image affects errors being encountered when recognising text, because this introduces ambiguities. It is difficult to recognise characters if there are not enough pixels, because low resolution reduces accuracy of mapping onto a character set stored in memory. It is particularly difficult to identify text that is low in height, because this results in characters that have a low number of pixels.

A low confidence measure indicates that the recognition by the character recognition unit 120 includes errors. A variety of techniques are available for identifying errors, for example:
- assigning a weight, W, to each character that identifies a probability that the recognised character accurately represents the character identified in the image;
- assigning a weight, average(W), to each word that that represents an average weight for all of the characters of the word;
- assigning a weight, maximum(W), to each word that represents the maximum weight for a particular character of the word;
- assigning a weight to each line that represents an average weight or a maximum weight for all of the characters of the line;
- performing a spell check to determine whether the detected words are included in a dictionary;
- determining whether detected words include any inconsistent features, such as containing punctuation;
- comparing the different words that have been recognised to assess whether the words have appropriate context, such as checking the grammar;
- determining the number of pixels that make up the character in the image, because this indicates the resolution of the first region that has been used to obtain the first group of characters;
- determining the height of the characters in the image, because a low height of characters results in a low number of pixels making up the character; and
- any combination of the above techniques, such as taking in combination the measures average(W) and maximum(W).

In addition to there being an association between the first region and the first group of characters, these are both further associated with the confidence measure. For the situation in which a plurality of first regions has been identified corresponding to a plurality of first groups of characters, a plurality of confidence measures are calculated. It is possible that identification of the first region occurs retrospectively, once the first group of characters is identified as having a low confidence value.

In step S230, the determination unit 132 performs the function of determining whether further recognition is to be performed based on the confidence measure. If the confidence measure is low, this indicates that the first group of characters could include an error. Accordingly, if the confidence measure is below a threshold, this identifies that further processing should be performed. For the situation in which a plurality of first characters are identified having a low confidence measure, computer resources are allocated to performing further recognition for the confidence measures that are lowest, by selecting a maximum number of first groups of characters for which further recognition is to be performed.

The confidence measure corresponds to the first group of characters. Thus, the confidence measure corresponds to the first region. A mapping between the machine-encoded text and the image could occur after the confidence measure has been calculated, so that the first group of characters is associated with the first region. Alternatively, the mapping between the first region and the first group of characters could be established before the calculation of the confidence measure.

If no further recognition is to be performed, method S200 ends, which corresponds to the situation in which no errors have been identified in the machine-encoded text that has been output by the first recognition unit 121. However, if further recognition is to be performed, method S200 progresses to step S240. For the situation in which a plurality of first regions have been identified, method S200 progresses to step S240 for the first regions for which it is determined that further recognition is to be performed. Accordingly, if it is not necessary to perform further recognition, this allows the saving of resources, speeding up the performance of character recognition.

The determination of whether further recognition is to be performed is based on the confidence measure. If the threshold measure is below a threshold value, this indicates that the quality of the first character recognition is low, and so further recognition is to be performed. In particular, consideration is made of the weight values making up the confidence measure. Furthermore, consideration can be made of the number of pixels making up the characters, such as determining the height of the characters.

For the situation in which a plurality of first regions has been identified, each of the first regions is sorted based on the confidence measure. The first regions that are most in need of further recognition are given priority for the allocation of resources. The available amount of processing for providing further recognition is limited, and therefore a maximum number of first regions can be analysed further. This maximum number can be selected by the user, determined based on the size of the image document, or determined by evaluating the plurality of confidence measures that have been calculated. Alternatively, the sorting of the plurality of first regions allows the further recognition to be performed until the available resources have been depleted, such as there being a limited amount of processing available for further recognition, or such as a timer indicating that no further time is available for processing of further recognition.

In step S240, the selection unit 133 performs the function of selecting a second region of the image 300 that includes the first region, if it is determined that further recognition is to be performed for the first region.

The first region corresponds to a group of characters forming one or more words. The second region includes the first region, because a further recognition step is to be performed to this first region. However, the second region is larger than the first region because the second region further includes parts of the image that will provide context to the first region. The second region includes additional information to the first region, such as:
  words that are adjacent to the first region;
  the whole line of text that includes the first region; and
  parts of the image that have been identified as providing context to the first region.

In step S250, the second character recognition unit performs the function of further recognising a second group of characters 222 corresponding to the second region of the image 300.

The second region is a subset of the image. Accordingly, whereas the first character recognition unit 121 performs character recognition on the full document, the second character recognition unit 122 performs character recognition on a much smaller part of the image. Consequently, the second character recognition unit 122 is focussed on the second region, which has been identified as including an error as part of the first region. Furthermore, the second character recognition unit 122 makes use of the additional information that is identified as providing context to the first region.

The output of the second character recognition unit 122 is expected to be more accurate than the output of the first character recognition unit 121. Consequently, the corresponding part of the text that is output by the first character recognition unit 121 is replaced by the output of the second character recognition unit 122. The accuracy of the character recognition is enhanced by making use of a plurality of character recognition units 120 that are customised to the image that is being analysed, while balancing the allocation of computer resources.

As an alternative, the plurality of character recognition units 120 can include further character recognition units that are specialised for correcting errors in character recognition. The second character unit 122 can be customised to perform character recognition for a specific type of image, such as a low quality scan. Thus, the second character unit 122 is selected based on the second region being identified as having low quality. Accordingly, the image processing method S200 is performed for the image using the appropriate character recognition unit 120. The most appropriate second character recognition unit 122 is selected for performing the further recognition.

Figure 3A:
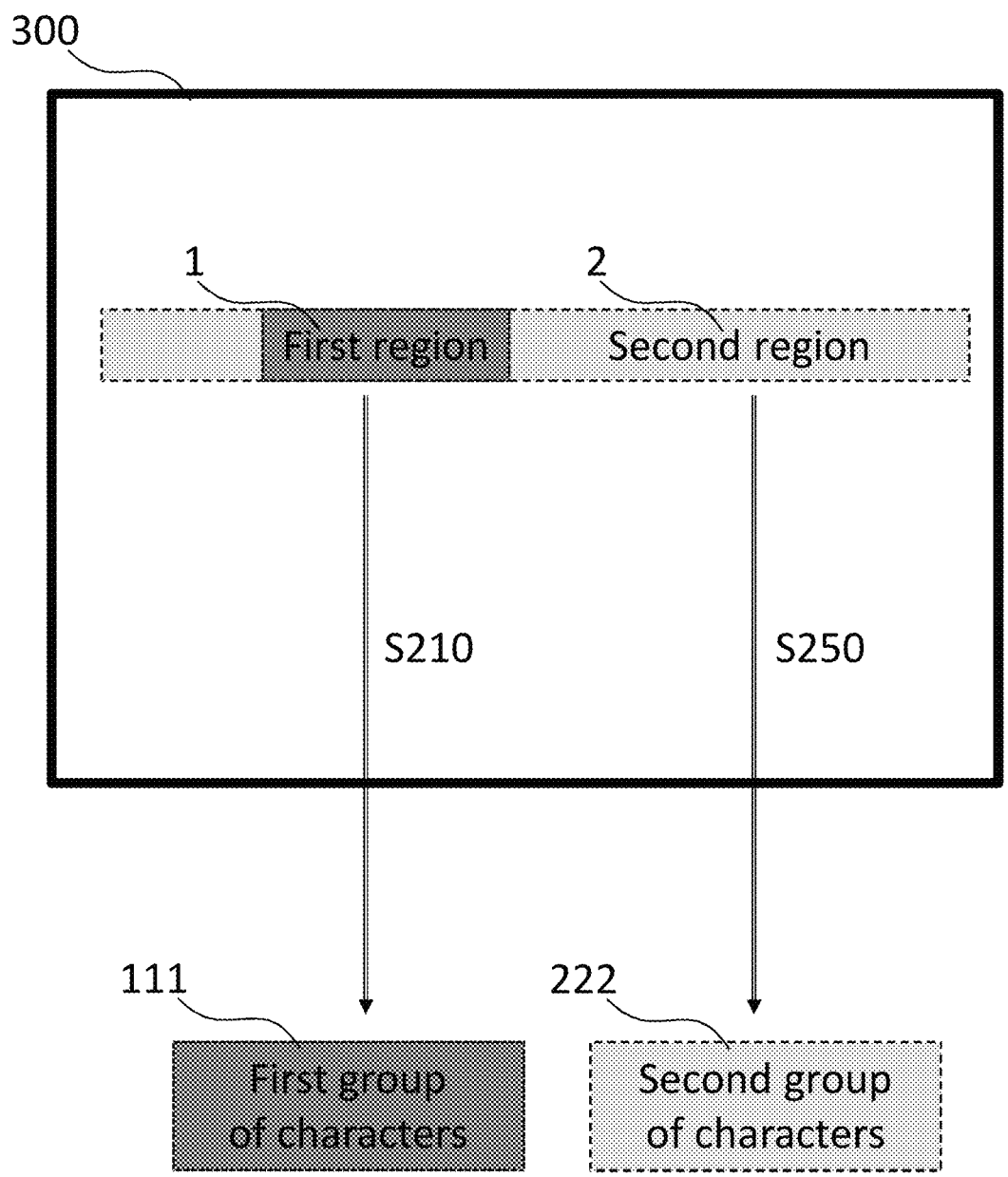
FIG. 3A is a diagram illustrating a first region for which character recognition results in a first group of characters, and a second region for which character recognition results in a second group of characters.

FIG. 3A is a diagram illustrating how the image processing method S200 identifies text included in the image 300.

In step S210, character recognition is performed by the first character recognition unit 121 on the first region 1, thus obtaining the first group of characters 111. Steps S220-S240 are performed to determine whether further recognition of the first region 1 is to be performed.

In step S250, character recognition is performed by the second character recognition unit 122 on the second region 2, thus obtaining the second group of characters 222.

FIG. 3A illustrates the second region 2 corresponding to a line of text. A line of text is selected because it is considered likely to provide context for the analysis of the first region 1. The second character recognition unit 122 is customised to analyse low quality images, and therefore the second group of characters is expected to have a higher confidence measure than the low confidence measure that was determined when performing character recognition of the first region 1 with the first character recognition unit 121.

Figure 3B:
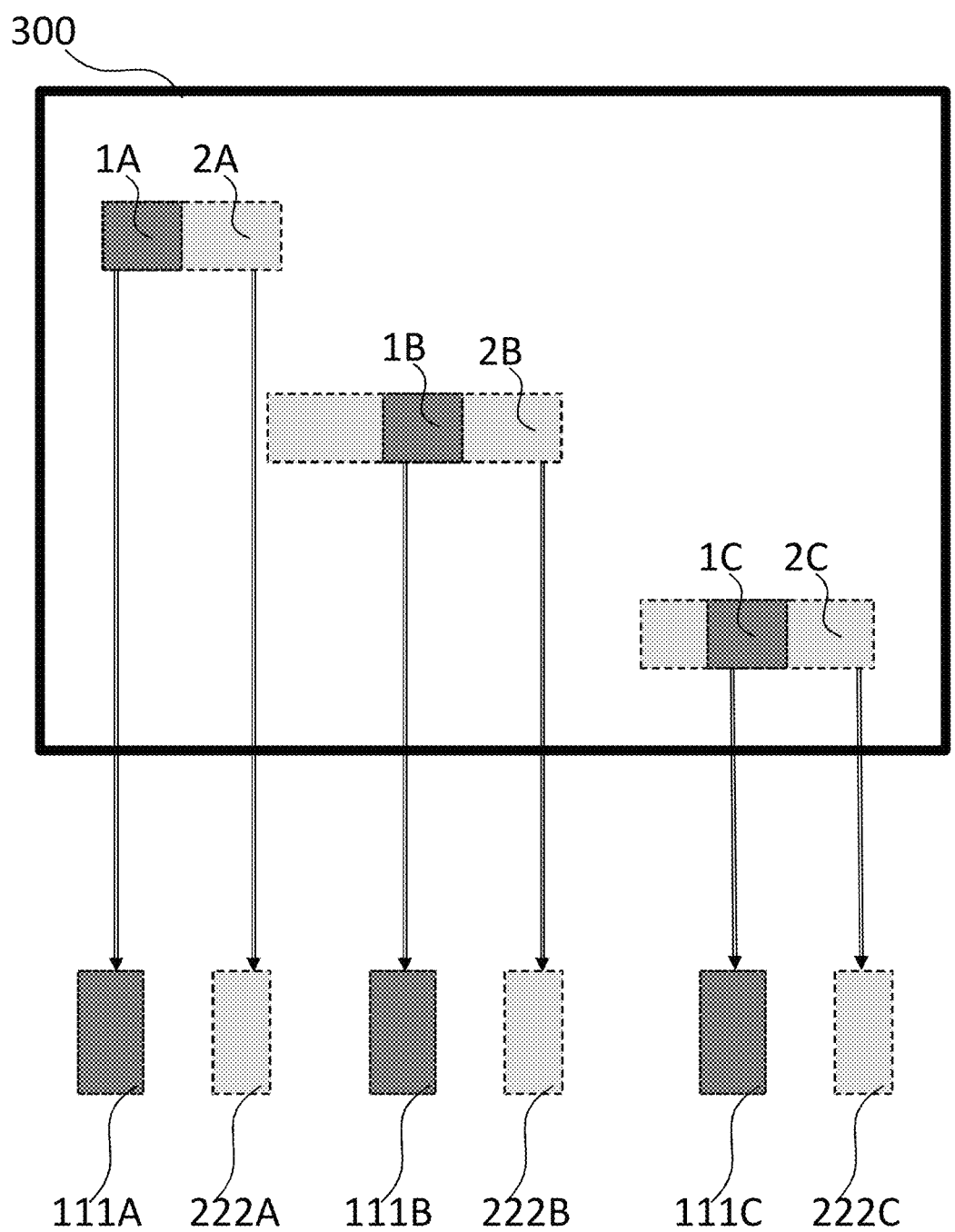
FIG. 3B is a diagram illustrating a plurality of first regions for which character recognition results in a plurality of first groups of characters, and a plurality of second regions for which character recognition results in a plurality of second groups of characters.

FIG. 3B is a diagram illustrating how the image processing method S200 identifies text included in the image 300.

In step S210, character recognition is performed by the first character recognition unit 121 on the plurality of first regions 1A-C, thus obtaining the plurality of first groups of characters 111A-C. Optionally, the first character recognition unit 121 is configured to analyse the whole document, although alternatively, the first character recognition unit 121 is configured to analyse a part of the document. Steps S220-S240 are performed to determine whether further recognition is to be performed of each of the first regions 1A-1C.

In step S250, character recognition is performed by the second character recognition unit 122 on the plurality of second regions 2A-C, thus obtaining the plurality of second groups of characters 222A-C.

FIG. 3B illustrates the second regions 2A-C corresponding to words that are adjacent to the first regions 1A-C. One or more words that are adjacent to the first region 1A-C can be used. The number of words that are to be included in the second region 2A-C is specified in advance. Alternatively, the number of words can be determined by establishing whether there are sufficient words to provide context. If the first region 1A is a first word, there will be no words before the first region 1A, and so the second region 2A will be made up of adjacent words that appear after the first region 1A. Similarly, if the first region is a last word, there will be no words after the first region 1A, and so the second region 2A will be made up of adjacent words that appear before the first region 1A.

FIGS. 3A and 3B illustrate examples of the image processing method S200 that is performed by the image processing system 100, which can be provided separately or in combination. According, the selection unit 133 selects the second region based on settings that have been selected in advance of whether a line should be selected according to FIG. 3A or adjacent words should be selected according to FIG. 3B. Alternatively, an assessment can be made of whether the second region provides context that is to be used by the second character recognition unit 122.

FIGS. 4A-C and 5A-C illustrate examples of how the first region 111 and the second region 222 can be identified. As an alternative, the examples of FIGS. 4A-C and 5A-C can be provided in combination to identify the first region 111 and the second region 222. Furthermore, FIGS. 4A-C and 5A-C serve to illustrate how context provided by the second region 222 can be used to perform recognition of the first region 111.

FIGS. 4A-C provide an example of character recognition that makes use of context, for which the confidence value associated with a first group of characters 41 is used to determine that further recognition is to be performed for the first region 111 by the second character recognition unit 122.

FIG. 4A provides an example of a first group of characters 41 that is determined as containing an error based on the confidence measure.

Context is very important when reading a line of text. For example, what do you read?

"M4K35"

The measuring unit calculates a confidence value, which is low because the first group of characters 41 includes both letters and numbers. Accordingly, the determination unit 132 establishes that further recognition is to be performed.

The first group of characters 41 corresponds to the first region 111.

FIG. 4B provides an example of a group of characters 42 that includes the first group of characters 41.

Try reading this line:

"EXAMPLE OF A LINE WHERE CONTEXT M4K35 A DIFFERENCE."

The selection unit 133 identifies characters 42 output from the first character recognition unit 121 that are candidates for providing context to the first group of characters 41.

The provision of context can be active or passive. As a first example of passive context being provided, the characters 42 can be identified as being on the same line of text as the first group of characters 41. As a second example of passive context being provided, the characters 42 can be identified as being words that are adjacent to the first group of characters 41. An example of active context being provided, a context measure can positively identify that the group of characters 42 will provide context to the first group of characters 41.

The selection unit 133 makes use of the group of characters 42 to identify the second region 222 that will be useful for providing further recognition.

FIG. 4C provides an example of a second group of characters 43 for which errors have been corrected.

The second group of characters 43 is output by the second character recognition unit 122 performing character recognition of the second region 222 of the image.

As a result, the text is corrected to read:

"EXAMPLE OF A LINE WHERE CONTEXT MAKES A DIFFERENCE."

For the second group of characters 43 output by the second character recognition unit 121, the measuring unit 131 calculates a confidence level that is higher than the group of characters 42 that were output by the first character recognition unit 122.

The errors that were introduced by the first character recognition unit 121 have been corrected by the second character recognition unit 122. Accordingly, the characters 42 that were output by the first character recognition unit 121 are replaced by the second group of characters 43 that were output by the second character recognition unit.

Figures 5A, 5B, 5C:
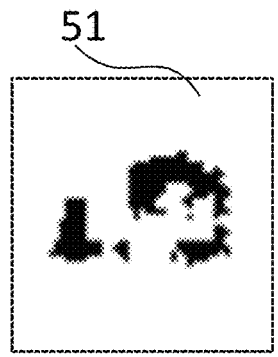
FIG. 5A provides an example of a first region for which it is determined that further recognition is to be performed based on a confidence measure.
FIG. 5B provides an example of a second region that is selected by image processing system, wherein the second region includes the first region.
FIG. 5C provides an example of a line of text in an image, which identifies the first region and the second region.

FIGS. 5A-C provide another example of character recognition that makes use of context, for which the confidence value associated with a first region 51 is used to determine that further recognition is to be performed by the second character recognition unit 122.

FIG. 5A provides an example of a first region 51 that is detected by the image processing system 100.

The first character recognition unit 121 performs character recognition on the full image. Consider the situation in which a first group of characters 111 is identified including two or three characters that forms a single word. Furthermore, the first group of characters 111 is recognised as the machine-encoded characters "LO". The first group of characters 111 is associated with the first region 51. The measuring unit 131 calculates a confidence value that is low, which could be because:

the number of pixels of region 51 is low;

the pixels do not map precisely to any of the machine-encoded characters stored by the first character recognition unit 121; and performing a spellcheck of the word "LO" indicates that there is likely to be an error.

It is difficult to visually identify letters corresponding to the image shown in FIG. 5A, because the quality of the image is low, and there is no context to determine any meaning of the detected pixels.

FIG. 5B provides an example of a second region 52 that is selected by image processing system 100.

The first region 51 is included in the second region 52. The second region 52 provides context to the first region 51 by including some of the words that are adjacent to the first region 51.

The second character recognition unit 122 is performed on the second region, which results in the second group of characters:

"describes in greater detail".

FIG. 5C provides an example of a line of text 53. The first region 51 of the line 53 corresponds to the first region 51 shown in FIG. 5A. The second region 52 of the line 53 corresponds to the second region 52 shown in FIG. 5B.

The context provided to the first region 51 by the adjacent words that are included in the second region 52 results in an increased confidence measure. Accordingly, the second group of characters 222 replaces the corresponding characters that were recognised by the first character recognition unit 111.

Accordingly, the line of text 53 is recognised to read:

"The next section describes in greater detail".

The above examples can also be realised by a computer of a system or apparatus (or devices such as a CPU or MPU) that reads out and executes a program recorded on a memory device to perform the functions of the above-described examples, and by a method, the steps of which are performed by a computer of a system or apparatus by, for example, reading out and executing a program recorded on a memory device to perform the functions of the above-described examples. For this purpose, the program is provided to the computer for example via a network or from a recording medium of various types serving as the memory device (e.g., a computer-readable medium such as a non-transitory computer-readable medium).

While the present invention has been described with reference to embodiments, it is to be understood that the invention is not limited to the disclosed embodiments. The present invention can be implemented in various forms without departing from the principal features of the present invention. The scope of the following claims is to be accorded the broadest interpretation so as to encompass all such modifications and equivalent structures and functions.

The invention claimed is:

1. An image processing method for recognizing characters included in an image, the image processing method comprising:
   identifying a first group of characters corresponding to a first region of the image based on the output of a first character recognition unit;
   calculating a confidence measure of the first group of characters;
   determining that further recognition is to be performed based on the confidence measure;
   selecting a second region of the image that includes the first region and words that are identified as being adjacent to said first region, when it is determined that further recognition is to be performed; and
   performing further recognition on the second region of the image, by a second character recognition unit different to said first character recognition unit, of a second group of characters corresponding to the second region of the image,
   wherein further recognition of the second group of characters makes use of a neural network that has been trained to recognize a plurality of strings of words.

2. The method according to claim 1, further comprising:
   performing recognition on a plurality of first regions of the image, by the first character recognition unit, of a plurality of first groups of characters corresponding to the plurality of first regions of the image;
   calculating a confidence measure for each of the first groups of characters;
   determining whether further recognition is to be performed for each of the first group of characters, based on the corresponding confidence measure;
   selecting a plurality of second regions of the image that each include the corresponding first region, when it is determined that further recognition is to be performed; and
   performing further recognition on the plurality of second regions of the image, by the second character recognition unit, of a plurality of second groups of characters corresponding to the plurality of second regions of the image.

3. The method according to claim 2, wherein determining whether further recognition is to be performed comprises selecting a maximum number of first groups of characters, based on the confidence measure for each of the first group of characters.

4. The method according to claim 1, wherein recognition of the first group of characters comprises at least one of:
   matrix matching, wherein the first region is compared to a glyph; and
   feature extraction, wherein the first region is compared to a plurality of features of a glyph.

5. The method according to claim 1, wherein the confidence measure is based on at least one of:
   an average weight for all of the characters of the first group of characters; and
   a maximum weight for all of the characters of the first group of characters.

6. The method according to claim 1, wherein it is determined that further recognition is to be performed if the confidence measure is below a threshold value.

7. The method according to claim 1, wherein it is determined that further recognition is to be performed if the first group of characters correspond to text in the first region that is identified as having at least one of:
   a number of pixels that is below a threshold value; and
   a height that is below a threshold value.

8. The method according to claim 1, wherein further recognition of the second group of characters is customised to at least one of:
   the second region of the image; and
   an image that is low quality.

9. The method according to claim 1, wherein the second region further comprises words that are identified as being on the same line of text as the first region.

10. The method according to claim 1, wherein the second region further comprises words that are identified as providing context to the first region.

11. An image processing system for recognizing characters included in an image, the image processing system comprising:
    a first character recognition unit configured to identify a first group of characters corresponding to the first region of the image;
    a measuring unit configured to calculate a confidence measure of the first group of characters;
    a determination unit configured to determine that further recognition is to be performed based on the confidence measure;
    a selection unit configured to select a second region of the image that includes the first region and words that are identified as being adjacent to said first region, when it is determined that further recognition is to be performed; and
    a second character recognition unit different to said first character recognition unit, configured to perform further recognition on the second region of the image, of a second group of characters corresponding to the second region of the image,
    wherein further recognition of the second group of characters makes use of a neural network that has been trained to recognize a plurality of strings of words.

12. The image processing system according to claim 11, wherein the first character recognition unit is configured to perform at least one of:
    matrix matching, wherein the first region is compared to a glyph; and
    feature extraction, wherein the first region is compared to a plurality of features of a glyph.

13. The image processing system according to claim 11, wherein the second character recognition unit performs further recognition of the second group of characters that is customised to at least one of:
    the second region of the image; and
    a region of an image that is low quality.

14. A non-transitory computer-readable medium storing a program that, when implemented by an image processing system, causes the image processing system to perform a method for recognizing characters included in an image, the image processing method comprising:
    identifying a first group of characters corresponding to the a first region of the image based on the output of a first character recognition unit;
    calculating a confidence measure of the first group of characters;
    determining that further recognition is to be performed based on the confidence measure;
    selecting a second region of the image that includes the first region and words that are identified as being adjacent to said first region, when it is determined that further recognition is to be performed; and
    performing further recognition on the second region of the image, by a second character recognition unit different to said first character recognition unit, of a second group of characters corresponding to the second region of the image, wherein further recognition of the second group of characters makes use of a neural network that has been trained to recognize a plurality of strings of words.

\* \* \* \* \*